US007408661B2

(12) United States Patent
Hoshino et al.

(10) Patent No.: US 7,408,661 B2
(45) Date of Patent: Aug. 5, 2008

(54) CONTROL APPARATUS AND ITS METHOD, AND CONTROL PROGRAM AND STORAGE MEDIUM HOLDING IT, WITH ACCESS DESIGNATING SECOND ADDRESS BEING PERFORMED BASED ON LINK TO THE SECOND ADDRESS INCLUDED IN DISPLAY INFORMATION

(75) Inventors: Hitoshi Hoshino, Nagoya (JP); Yutaka Tokura, Irvine, CA (US); Kiyoshi Tokashiki, Kanagawa (JP); Masahiro Takayanagi, Gunma (JP); Yoshinori Ito, Tokyo (JP); Yuzo Harano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/267,645

(22) Filed: Oct. 10, 2002

(65) Prior Publication Data

US 2003/0074420 A1    Apr. 17, 2003

(30) Foreign Application Priority Data

Oct. 12, 2001    (JP) ............................. 2001-315666
Mar. 28, 2002    (JP) ............................. 2002-091748

(51) Int. Cl.
*G06F 15/00*    (2006.01)
*G06F 15/16*    (2006.01)

(52) U.S. Cl. .............................. 358/1.15; 710/3; 710/4; 709/203; 709/219

(58) Field of Classification Search ................ 358/1.15; 710/3, 4; 709/203, 219, 220, 238, 245, 244, 709/250
See application file for complete search history.

(56) References Cited

U.S. PATENT DOCUMENTS

| 5,956,487 | A | * | 9/1999 | Venkatraman et al. | ...... 709/218 |
| 5,960,168 | A | * | 9/1999 | Shaw et al. | ................ 358/1.15 |
| 6,240,455 | B1 | | 5/2001 | Kamasaka et al. | .......... 709/229 |
| 6,477,567 | B1 | | 11/2002 | Ohara | ........................ 709/223 |

(Continued)

FOREIGN PATENT DOCUMENTS

JP    11-053139    2/1999

(Continued)

OTHER PUBLICATIONS

Nikkei Byte, No. 221, Nikkei Business Publications, Inc., pp. 142-149 (Sep. 22, 2001) (with English-language translation).

(Continued)

*Primary Examiner*—Douglas Q. Tran
*Assistant Examiner*—Chan S Park
(74) *Attorney, Agent, or Firm*—Fitzpatrick, Cella, Harper & Scinto

(57) ABSTRACT

A controller which exists between a client apparatus and an image processing apparatus and which controls access from the client apparatus such that the client apparatus can use a network server function of the image processing apparatus, its control method and control program and storage medium. To accomplish this, the controller which exists between a client terminal and an image processing apparatus and which controls data transmitted from the client terminal to the image processing apparatus comprises an information providing unit which provides setup information of the controller to the client terminal and a transfer unit which transfers setup information of the image processing apparatus to the client terminal.

17 Claims, 12 Drawing Sheets

U.S. PATENT DOCUMENTS

| | | | |
|---|---|---|---|
| 6,631,010 B1 * | 10/2003 | Foster et al. | 358/1.15 |
| 6,704,775 B1 * | 3/2004 | Sato et al. | 709/219 |
| 6,943,903 B2 * | 9/2005 | Simpson et al. | 358/1.12 |
| 6,943,910 B2 * | 9/2005 | Tanimoto | 358/1.15 |
| 6,970,923 B1 | 11/2005 | Mukaiyama et al. | 709/223 |
| 7,002,703 B2 * | 2/2006 | Parry | 358/1.15 |

FOREIGN PATENT DOCUMENTS

| | | |
|---|---|---|
| JP | 11-161602 | 6/1999 |
| JP | 11-161672 | 6/1999 |
| JP | 2000-347976 | 12/2000 |

OTHER PUBLICATIONS

Oct. 16, 2006 Japanese Official Communication (with English-language translation).

* cited by examiner

FIG. 12

| TRANSMISSION SOURCE ADDRESS | TRANSMISSION SOURCE LOGICAL PORT NUMBER | TRANSFER RECEPTION LOGICAL PORT NUMBER |
|---|---|---|
| 10.255.255.2 | 1234 | 54321 |
| | | |

CONTROL APPARATUS AND ITS METHOD, AND CONTROL PROGRAM AND STORAGE MEDIUM HOLDING IT, WITH ACCESS DESIGNATING SECOND ADDRESS BEING PERFORMED BASED ON LINK TO THE SECOND ADDRESS INCLUDED IN DISPLAY INFORMATION

FIELD OF THE INVENTION

The present invention relates to control apparatus and its control method, and control program and storage medium holding the program.

BACKGROUND OF THE INVENTION

In recent years, many image processing apparatuses such as a printer, a scanner, a facsimile machine, or an apparatus with functions of these devices have a network communication function. Some of these image processing apparatuses have a network server function, as an information providing function of transmitting data, where setup window for setting the image processing apparatus is described, to a web browser on a PC, a server or the like connected to the apparatuses via a network, for user's setting and operations of device via the web browser. Further, some image processing apparatuses have a data transfer function of transferring image data or the like to a PC, a server or the like connected to the apparatuses via a network.

In the data transfer function, higher-order protocols such as the SMTP protocol for transfer of electronic mail, the i-Fax, the HTTP (Hyper Text Transfer Protocol) enabling file uploading and the FTP (File Transfer Protocol) for file transfer are used.

On the other hand, an external controller is known as a means of expanding the functions of the image processing apparatus. The external controller performs a network-function expansion function of converting data in the communication format of a user environment network (LAN) to data corresponding to the I/F format of the image processing apparatus, a storage expansion function of spooling communication data, a load distribution function of performing a part of processing by the image processing apparatus or a client apparatus, and the like.

Further, as the connection among the image processing apparatus, the external controller and the LAN, the dual network type connection where the external controller is connected between the image processing apparatus and the LAN and the external controller performs its interface function therebetween, and a single network type connection where the image processing apparatus and the external controller are respectively connected to the LAN are known.

In comparison with the single network type connection, the dual network type connection is advantageous in that the band of the LAN is not consumed since an independent local network is constructed between the external controller and the image processing apparatus. In the dual network type connection, a large amount of image data can be transmitted between the external controller and the image processing apparatus by using a transmission format of band wider than the LAN band the local network.

Further, in the dual network type connection, the external controller and the image processing apparatus operate as one network apparatus. On the other hand, in the single network type connection, the external controller and the image processing apparatus respectively consume logical resources such as network addresses and physical resources such as hub ports. Accordingly, the dual network type connection is advantageous in that the amount of consumption of network resources in the LAN is smaller than that in the single network type connection.

However, if the conventional external controller is connected between the LAN and the image processing apparatus, the image processing apparatus itself cannot perform communication on the LAN, and the above-described data transfer function of the image processing apparatus cannot be utilized on the LAN.

SUMMARY OF THE INVENTION

Accordingly, the present invention has its object to enable the client apparatus to use of the information providing function of the image processing apparatus even if the external controller is connected between the image processing apparatus capable of network communication and the network.

Further, the present invention has another object to provide the data transmission function of the image processing apparatus to the client apparatus even if the external controller is connected between the image processing apparatus capable of network communication and the network.

According to the present invention, the foregoing object is attained by providing a control apparatus which controls data communication between a client apparatus and an image processing apparatus, comprising display information providing means for providing display information stored in the control apparatus to a browser of the client apparatus in correspondence with access designating a first address from the client apparatus, and transfer means for transferring display information stored in the image processing apparatus to the client apparatus in correspondence with access designating a second address from the client apparatus.

According to another aspect of the present invention, the foregoing object is attained by providing a control apparatus having a first network interface for connection with a first network to which an information processing apparatus is connected, and a second network interface for connection with a second network to which an image processing apparatus is connected, comprising transmission destination address determination means for determining whether or not a transmission destination address of data inputted into the second network interface from the image processing apparatus is an address of the second network interface, change means for, in correspondence with a determination that the transmission destination address is not the address of the second network interface, changing a transmission source address of the data to an address of the first network interface, and data output means for outputting the data changed by the change means via the first network interface to the first network.

In still another aspect of the present invention, the foregoing object is attained by providing a control apparatus having a first network interface for connection with a first network to which an information processing apparatus is connected, and a second network interface for connection with a second network to which an image processing apparatus is connected, comprising a memory holding a program for determining whether or not a transmission destination address of data from the image processing apparatus, inputted into the second network interface, is an address of the second network interface, changing a transmission source address of the data to an address of the first network interface, and outputting the changed data via the first network interface to the first network, and a processor that performs the program for determining whether or not the transmission destination address of data from the image processing apparatus, inputted into the second network interface, is the address of the second network interface, changing the transmission source address of the data to the address of the first network interface, in correspondence with a determination that the transmission destination address is not the address of the second network interface, and outputting the changed data via the first network interface to the first network.

In still another aspect of the present invention, the foregoing object is attained by providing a control apparatus having a first network interface for connection with a first network to which an information processing apparatus is connected, and a second network interface for connection with a second network to which an image processing apparatus is connected, comprising transmission destination address determination means for determining whether or not a transmission destination address of data inputted into the second network interface from the image processing apparatus is a broadcast address of the second network, change means for, in correspondence with a determination that the transmission destination address is the broadcast address of the second network, changing a transmission source address of the data to an address of the first network interface, and changing the transmission destination address of the data to a broadcast address of the first network, and data output means for outputting the data changed by the change means via the first network interface to the first network.

In still another aspect of the present invention, the foregoing object is attained by providing a control apparatus having a first network interface for connection with a first network to which an information processing apparatus is connected, and a second network interface for connection with a second network to which an image processing apparatus is connected, comprising a memory holding a program for determining whether or not a transmission destination address of data from the image processing apparatus, inputted into the second network interface, is a broadcast address of the second network interface, changing a transmission source address of the data to an address of the first network interface and changing the transmission destination address of the data to a broadcast address of the first network, and outputting the changed data via the first network interface to the first network, and a processor that performs the program for determining whether or not the transmission destination address of data from the image processing apparatus, inputted into the second network interface, is the broadcast address of the second network interface, changing the transmission source address of the data to the address of the first network interface and changing the transmission destination address of the data to the broadcast address of the first network, in correspondence with a determination that the transmission destination address is the broadcast address of the second network interface, and outputting the changed data via the first network interface to the first network.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is an example of conversion table.

DETAILED DESCRIPTION OF THE PREFERRED EMBODIMENTS

Preferred embodiments of the present invention will now be described in detail in accordance with the accompanying drawings. Note that relative arrangement of constituent elements, display images and the like in the embodiments, unless particularly described, do not pose any limitation on the scope of the invention.

Note that in the description, an external controller includes all the apparatuses which control data transmitted between a client apparatus having a browser and an image processing apparatus such as a printer, a scanner, a copier, a facsimile machine, a digital camera and a digital video camera. For example, the control apparatus is a conception including a print controller box and a distributed print server. Further, the client apparatus is not necessarily a personal computer, but it may be a cellular phone, a digital camera, a digital video camera or the like as long as it has a browser.

First Embodiment

Figure 1:
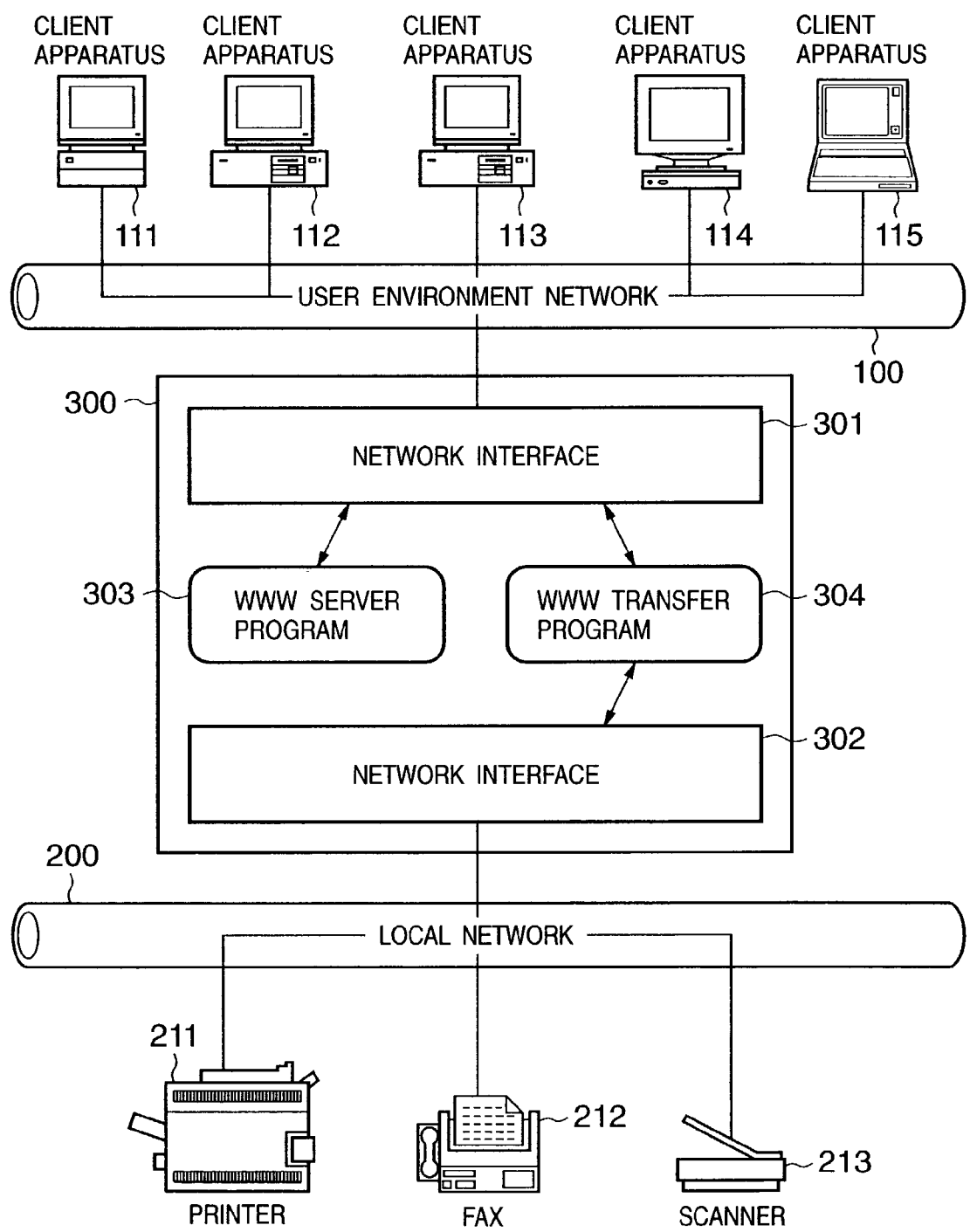
FIG. 1 is a diagram showing the overview of a system using an external controller according to a first embodiment of the present invention.

FIG. 1 shows the overview of system using an external controller according to a first embodiment of the control apparatus of the present invention.

Plural client apparatuses (PCs, Macintosh machines, UNIX work stations or the like) 111 to 115 and an external controller 300 are connected to a user environment network 100. The external controller 300 is also connected to a local network 200, to which a printer 211, a facsimile machine (FAX) 212 and a scanner 213 are connected as image processing apparatuses. The external controller 300 has network interfaces 301 and 302 used for connection with the user environment network 100 and a local network 200 in the present system. In the external controller 300, a WWW server program 303 for WWW services and a WWW transfer program 304 for data transfer to the various image processing apparatuses operate.

In addition to the well-known WWW HTTP TCP port (with RFC1700 ASSIGNED NUMBER 80), the external controller has at least one WWW HTTP TCP port. One of the ports is used for WWW server function unit inside the external controller, and the other one is used as a transfer port for access to the WWW server function unit inside the image processing apparatus.

If the well-known port of the network interface 301 is accessed from the client apparatus, the access is processed by the WWW server program 303, then an HTTP source of the external controller 300 is transmitted to the client apparatus, and a setting image of the external controller 300 is displayed on a browser of the client apparatus. On the other hand, if the transfer port is accessed, the WWW transfer program transfers the access to the WWW HTTP well-known port of any one of the image processing apparatus in accordance with the type of the transfer port, thereby the access is processed by a WWW server program (not shown in FIG. 1) in the image processing apparatus.

That is, the client apparatuses 111 to 115 can access both of the WWW server of the image processing apparatuses 211 to 213 and the WWW server of the external controller 300.

Note that the respective image processing apparatuses are provided with the transfer port.

According to the present embodiment, even if the external controller apparatus is connected between an image processing apparatus connected to a network and the network, a client apparatus can use WWW services provided from the external controller and the image processing apparatus.

Second Embodiment

Next, a print controller box according to a second embodiment of the present invention will be described.

The print controller box of the present embodiment is a more particular example of the external controller of the first embodiment.

Figure 2:
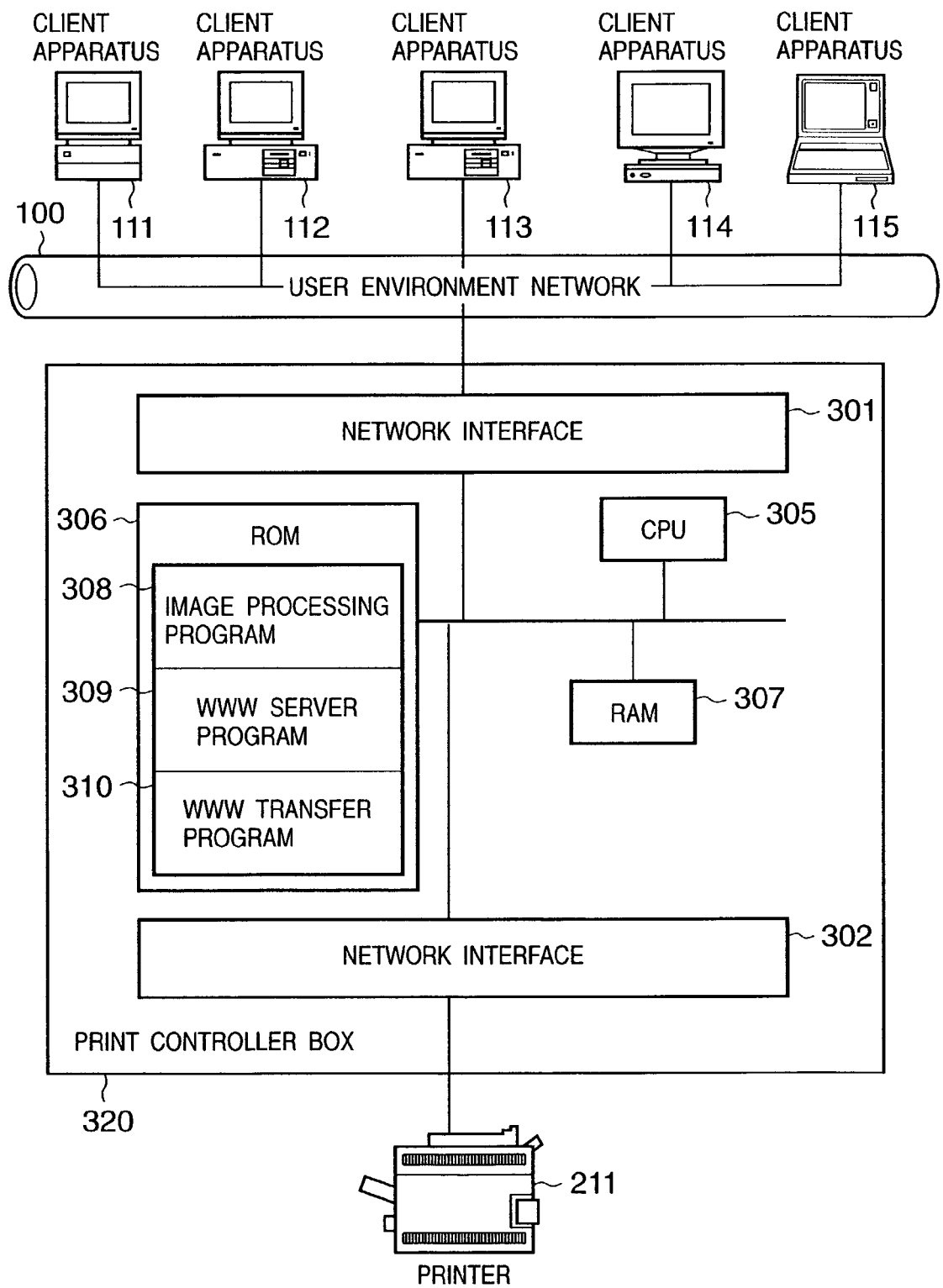
FIG. 2 is a diagram showing the overview of the system including a print controller box according to a second embodiment of the present invention.

FIG. 2 is shows the overview of the system including the print controller box. As in the case of the external controller described in the above first embodiment, this print controller box 320 has the two network interfaces 301 and 302. The network interface 301 is connected to the user environment network 100, and the network interface 302 is directly connected to the printer 211 via a cross cable. The print controller box 320 has a CPU 305 which controls the entire operation of the print controller box 320, a ROM 306 in which various programs and related data are stored, and a RAM 307 for temporarily storing the program read from the ROM 306 for execution by the CPU 305 or for spooling print image data. The CPU 305 receives a print request from the client apparatuses 111 to 115 and spools image data into the RAM 307, or executes an image processing program 308 stored in the ROM 306 to perform image bitmapping, RIP or image combining on the data then transmits the image data to the printer 211. Further, a WWW server program 309 is stored in the ROM 306 of the print controller box 320. The WWW server program performs various setups and operations of the print controller box by the WWW browser on the client apparatus 111 to 115. The various setups and operations of the print controller box 320 include e.g. display of the status of the print controller box 320, job operations such as deletion and duplication of spool job, log display of print job, network setting such as IP address setting, print operation for viable data in cooperation with a data base.

On the other hand, the printer 211 connected to the print controller box 320, having a network communication function and a WWW server function, can perform various setups and operations of the printer 211 by the WWW browser on the client apparatuses 111 to 115. The various setups and operations of the printer include e.g. display of the status of the printer 211, timer setting such as setting of time before standby mode, network setting such as IP address setting, mail box setting such as setting of box name, display of information on equipment such as finisher, job operations such as cancellation, temporary suspension and the like of currently-performed job, and downloading of job in the box.

As shown in FIG. 2, when the print controller box 320 is connected between the printer 211 and the user environment network 100, the print controller box 320 enables the WWW transfer function such that the WWW services from the print controller box 320 and the printer 211 can be simultaneously utilized. If the WWW transfer function is enabled, the WWW transfer port to the printer is opened in addition to the well-known WWW HTTP TCP port with RFC1700 ASSIGNED NUMBER 80. When a connection request to the transfer port is received, the WWW transfer program 310 in the ROM 306 of the print controller box 320 establishes connection with the printer 211 then permits the client apparatus to establish connection. Then the WWW transfer program transmits all the data received from the client apparatus to the printer 211, and transmits data received from the printer 211 to the client apparatus.

Figure 3:
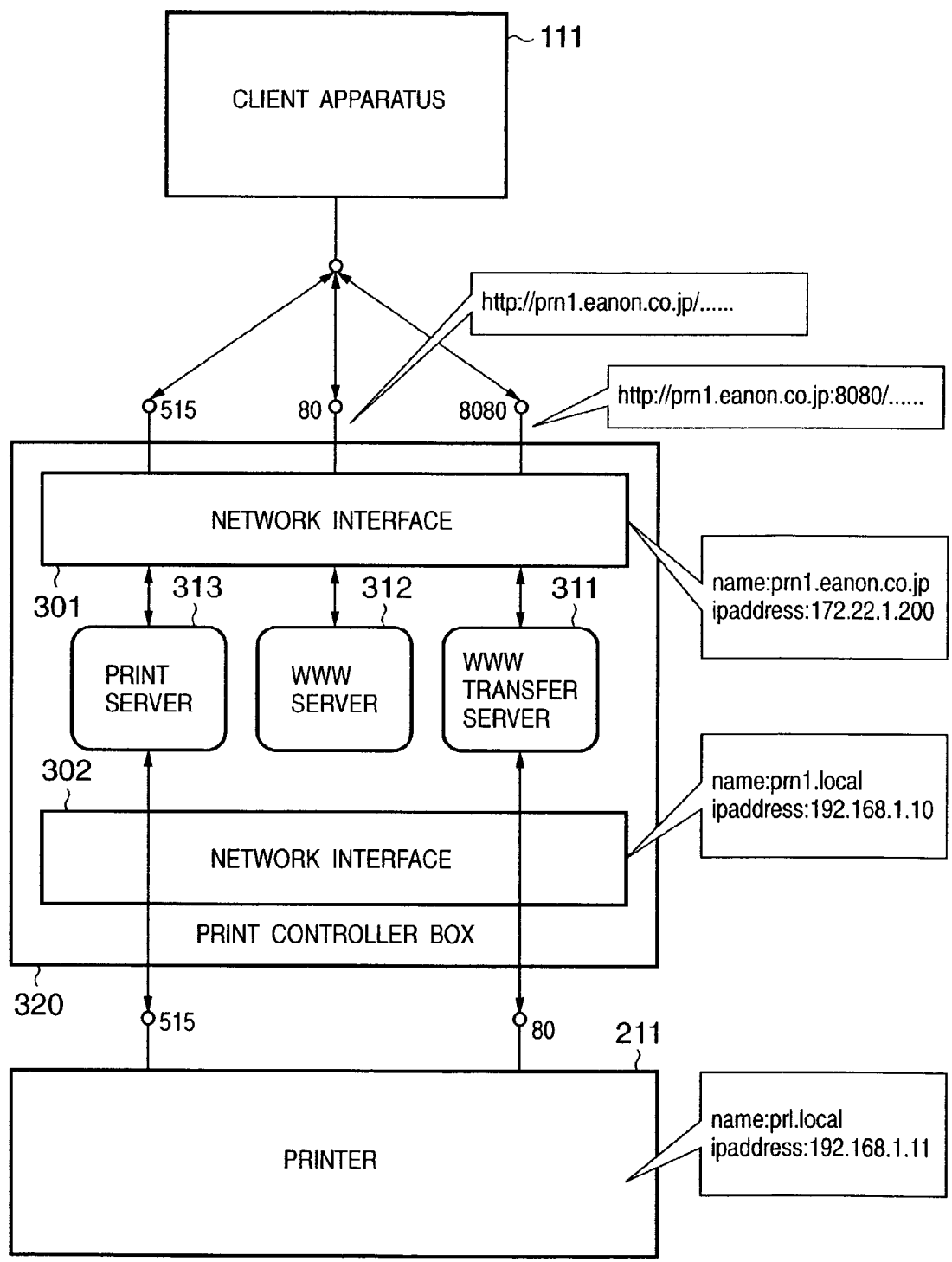
FIG. 3 is a block diagram showing the functional construction of the print controller box according to the second embodiment in relation with one client apparatus.

FIG. 3 shows the functional construction of the print controller box 320 in relation with one client apparatus. The figure shows a case where the controller box has a DNS name "prn1.abc.co.jp" in the user network, an IP address "172.22.1.200" and a transfer port number "8080". When a connection request to the port 8080 is received from the client apparatus, a WWW transfer server 311 immediately establishes connection with the port 80 of the printer, and performs data transfer between the port 8080 and the port 80 of the printer. If the user designates a transfer port on the browser, a URL (Uniform Resource Locator)

"http://prn1.abc.co.jp:8080/ . . . " or

"http://172.22.1.200:8080/ . . . " (a directory name and a file name are inserted in ". . . " in FIG. 3) is described. Note that in a structural language document such as HTML provided in the printer WWW services, a URL indicating a link destination is not an absolute address but is always a relative address.

As a default port number in the WWW browser of the client apparatus is well-known port 80, it is not necessary to designate the port number for the services in the port 80. In the example of FIG. 3, merely the URL "http://prn1.abc.co.jp/ . . . " is designated, and the WWW server 312 is accessible.

Upon simple printing, a print server 313 operates, and image data is outputted via a port 515 to the printer 211 and printing is performed.

Figure 4:
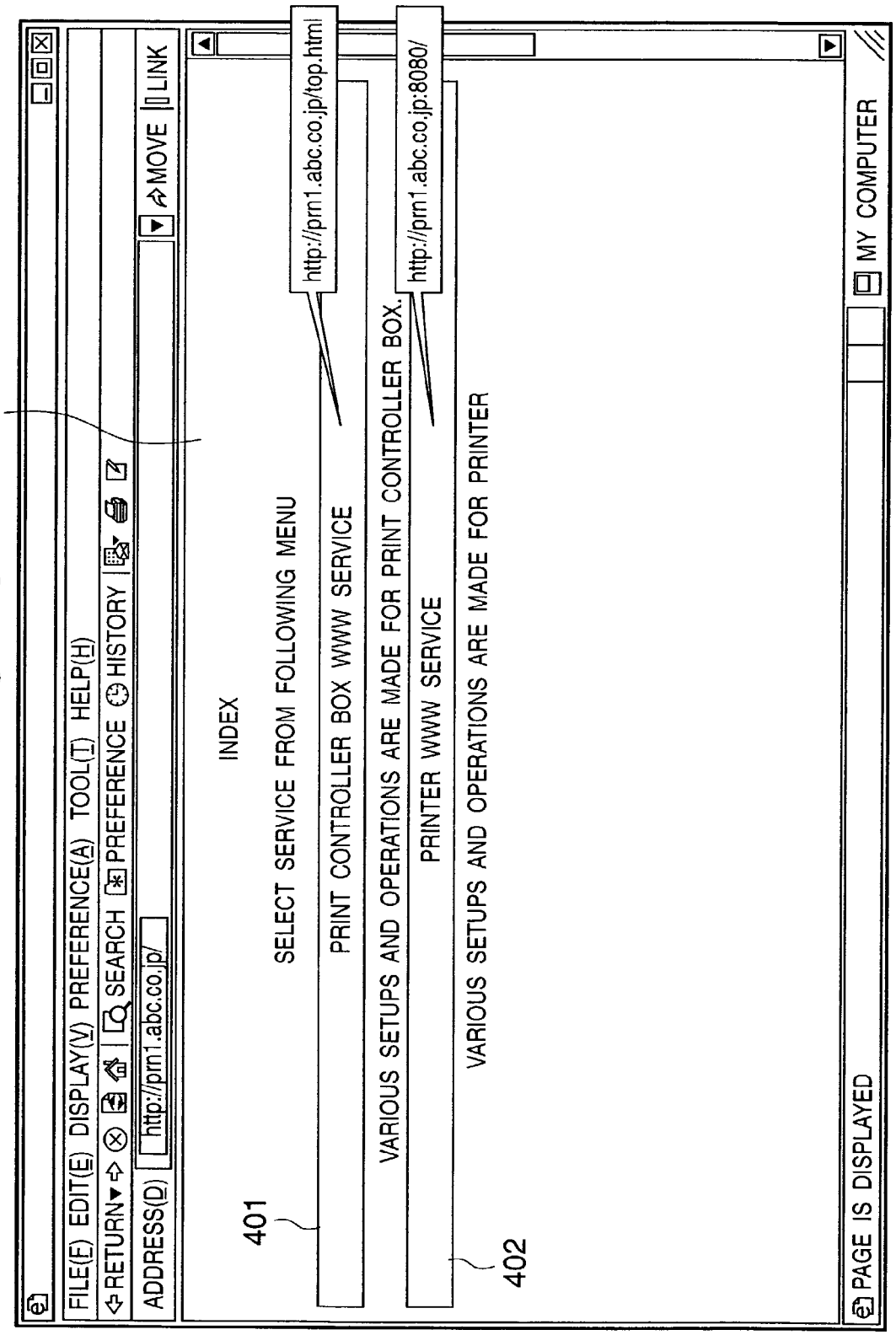
FIG. 4 is an example of browser image where a default page of effective root directory is displayed by the print controller box according to the second embodiment.

Note that since the port designating URL is not well known to general users, a link indicating connection to the transfer port is provided by the WWW service of the controller box. FIG. 4 shows an example of displayed image when the WWW service of the controller box is accessed (a URL "http://prn1.abc.co.jp/" is inputted).

FIG. 4 shows a browser displaying a default page 400 of effective root directory having a link 401 to the WWW service of the controller box and a link 402 to the transfer port.

In this example, a menu for selection of service is displayed on the default page, however, the menu may be included in the contents of the WWW service of the controller box.

Further, it may be arranged such that a setting image for setting enabled/disabled status of the WWW transfer function is stored in the print controller box, and only if the WWW transfer function is enabled in the setting image, the link to the transfer port is added to the WWW service of the external controller. In such case, if the WWW transfer function is disabled, the linkage to the transfer port is deleted. Further, it may be arranged such that the enabled/disabled status of the WWW transfer function is selected in accordance with the status of the printer side. In such case, if the transfer service is stopped when the power of the image processing apparatus is shut down, the user can easily determine whether or not the service can be utilized.

According to the present embodiment, the WWW server provided in the printer can be accessed merely by inputting the URL of the print controller box from the client apparatus and making connection by using a displayed link. Thus the WWW service of the printer can be used via the transfer port without the user's direct inputting the URL of the transfer port.

Third Embodiment

Next, a distributed print server according to a third embodiment of the present invention will be described.

As in the case of the above second embodiment, the distributed print server of the present embodiment is a more particular example of the external controller of the first embodiment.

Generally, a distributed print controller is connected to plural printers, and the controller has a function of distributing a received job to the plural printers. Regarding an image processing apparatus which has been directly connected to a user environment network before it is introduced to the system or which can be connected to the user environment network, the external controller such as the distributed print controller may have a function as an interface between the network and the image processing apparatus.

Figure 5:
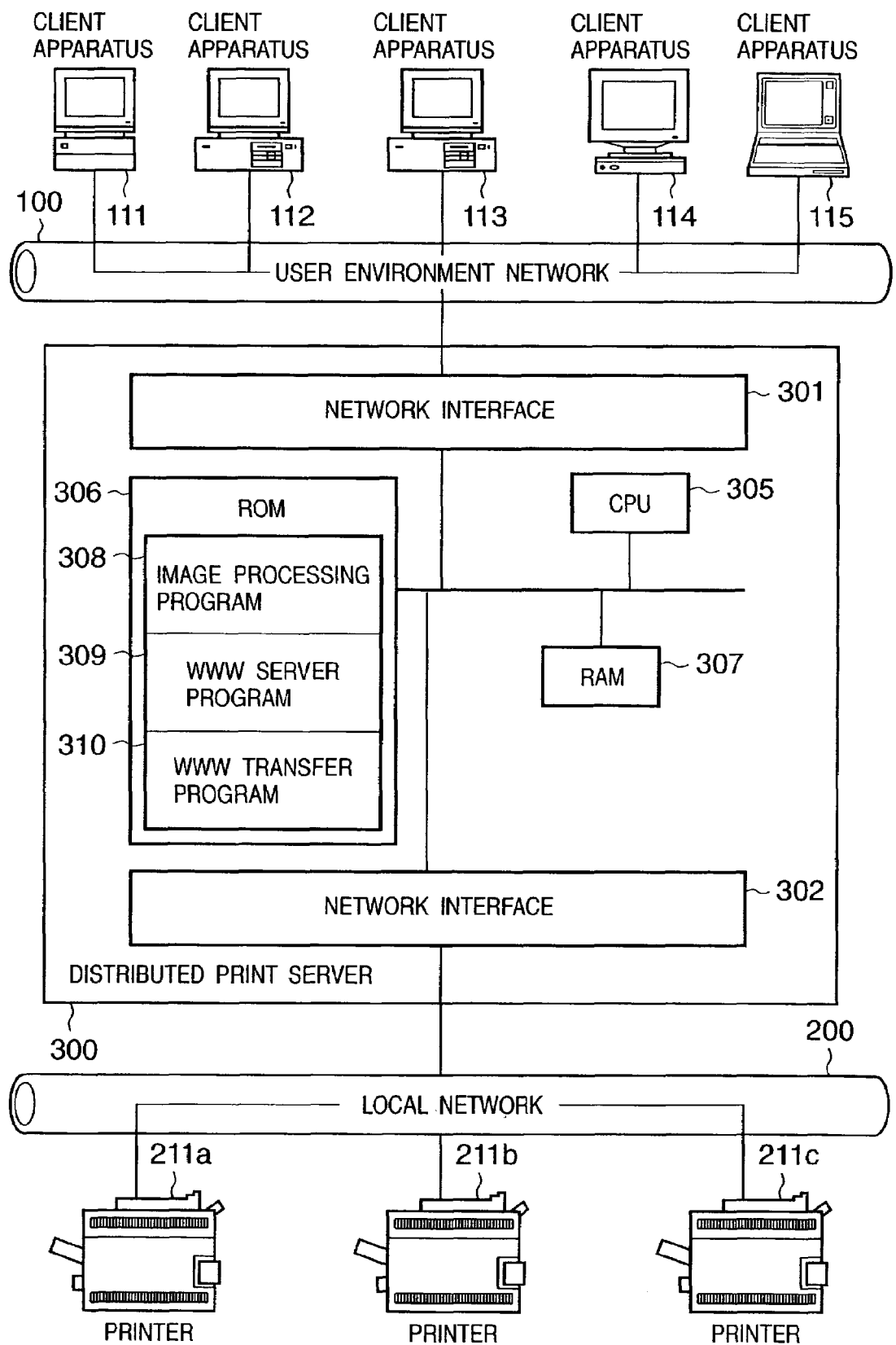
FIG. 5 is a diagram showing the overview of the system including a distributed print server according to a third embodiment of the present invention.

FIG. 5 shows the overview of the system including the distributed print server according to the third embodiment.

This distributed print server 330 also has the two network interfaces 301 and 302 connected to the user environment network 100, and the local network 200 to which plural printers 211a to 211c are connected. The distributed print server 330 receives a print request from the client apparatuses 111 to 115, and distributes the received print job to the plural printers 211a to 211c. The distributed print server 330 has a hardware construction the same as that of the print controller box 320 described in the second embodiment, therefore, the same constituent elements have the same reference numerals and explanations thereof will be omitted.

Note that the WWW server program 309 displays a setting image for various setups and operations of the distributed print server 330 on the WWW browser on the client apparatuses. The various setups and operations of the distributed print server 330 include e.g. designation of the way of distribution of each job and display of the result of job distribution.

The printers 211a to 211c connected to the distributed print server 330 respectively have a network communication function and a WWW server function and can perform various printer setups and operations by the WWW browser on the client apparatuses. The various printer setups and operations include e.g. display of printer status, timer setting such as setting of time before stand-by mode, network setting such as IP address setting, mail box setting such as setting of box name, display of information on equipment such as finisher, job operations such as cancellation, temporary suspension and the like of currently-performed job, and downloading of job in the box.

As shown in FIG. 5, even in a state where the user environment network and the local environment network are separated from each other, all the WWW services of the distributed print server and the respective printers can be simultaneously used by enabling the transfer function of the distributed print server.

If the WWW transfer function is enabled, the WWW transfer program opens the WWW transfer ports in correspondence with the number of transfer destination printers aside from the well-known port for reception of WWW service of the distributed print server itself. When a connection request is received via one of the ports from the client apparatus, the program performs transfer with the printer corresponding to the port.

Figure 6:
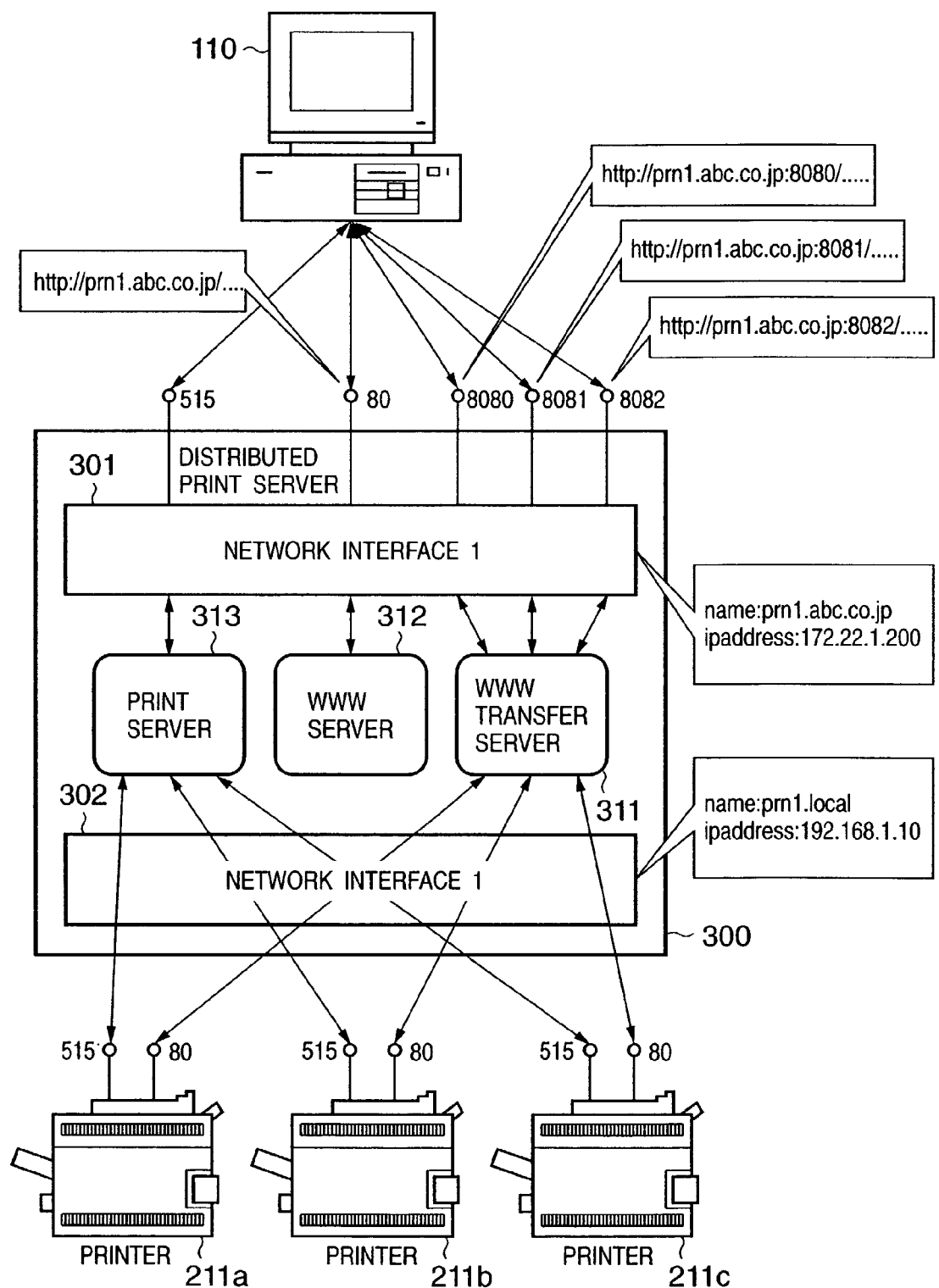
FIG. 6 is a diagram showing the functional construction of the distributed print server according to the third embodiment in relation with one client apparatus.

FIG. 6 shows the functional construction of the distributed print server 330 in relation with one client apparatus. In this example, three printers are connected to the distributed print server. The distributed print server has a DNS name "prn1.abc.co.jp" in the user network, an IP address "172.22.1.200", and it uses transfer ports 8080 to 8082. When a connection request to the port 8080 is received from the client, the WWW transfer server 311 immediately establishes connection with the port 80 of the printer 211a, and performs data transfer between the port 8080 and the port 80 of the printer 211a. Similarly, upon connection with the port 8081, data transfer is made to the printer 211b, and upon connection with port 8082, data transfer is made to the printer 211c.

Figure 7:
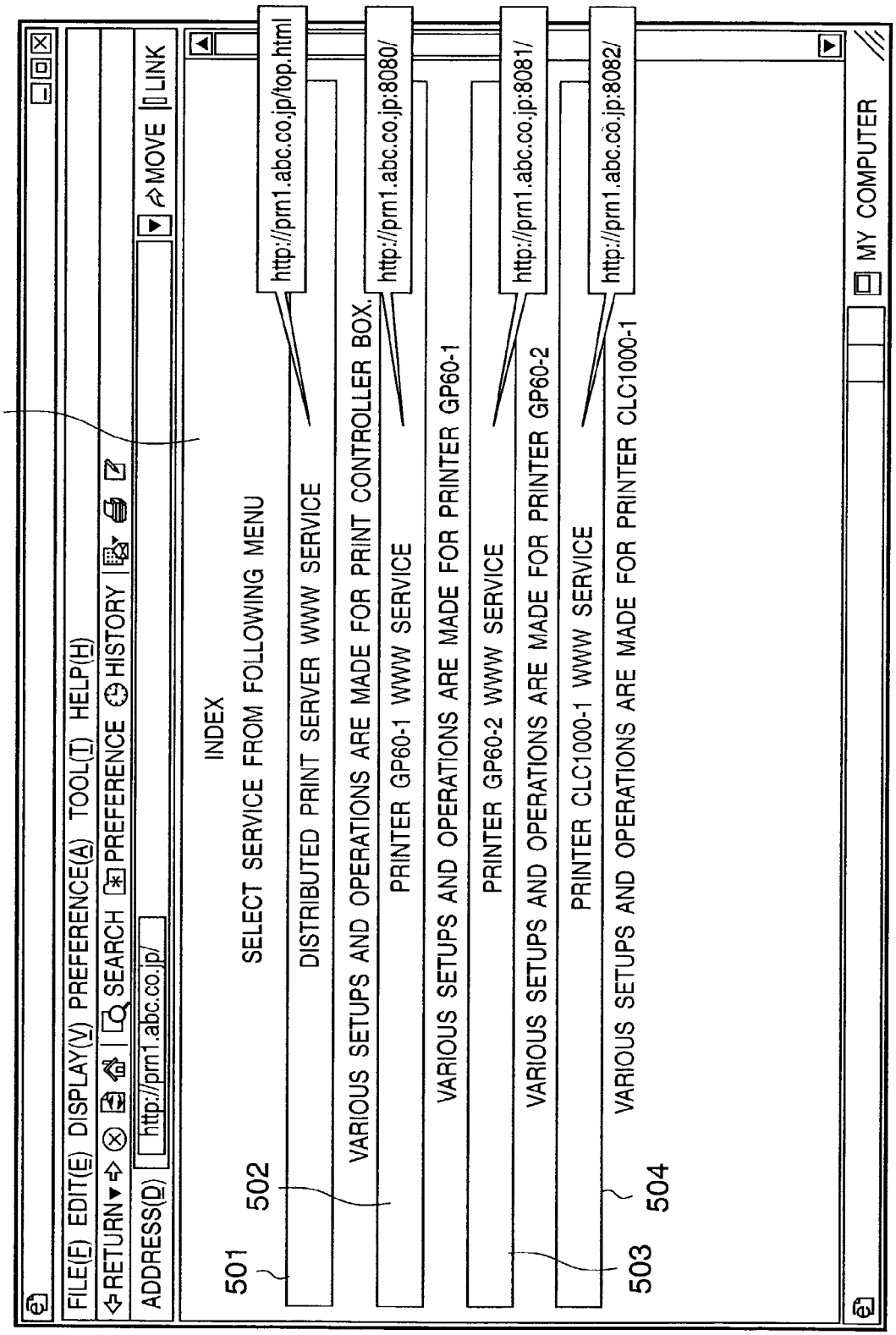
FIG. 7 is an example of browser image displaying a menu image of the distributed print controller according to the third embodiment.

As in the case of the second embodiment, a link indicating connection to a transfer function port is provided by the WWW service of the controller box. As shown in FIG. 7, links to the respective transfer ports are displayed in the default page of the root directory. FIG. 7 shows a menu image 505 displayed on the browser of the client apparatus when the WWW services of all the printers are available. Numeral 501 denotes a link to the WWW service of the distributed print server; 502, a link to the WWW service of the printer 221a (printer GP60-1 in the image); 503, a link to the WWW service of the printer 211b (printer GP60-2 in the image); and 504, a link to the WWW service of the printer 211c (printer CLC1000-1 in the image).

Figure 8:
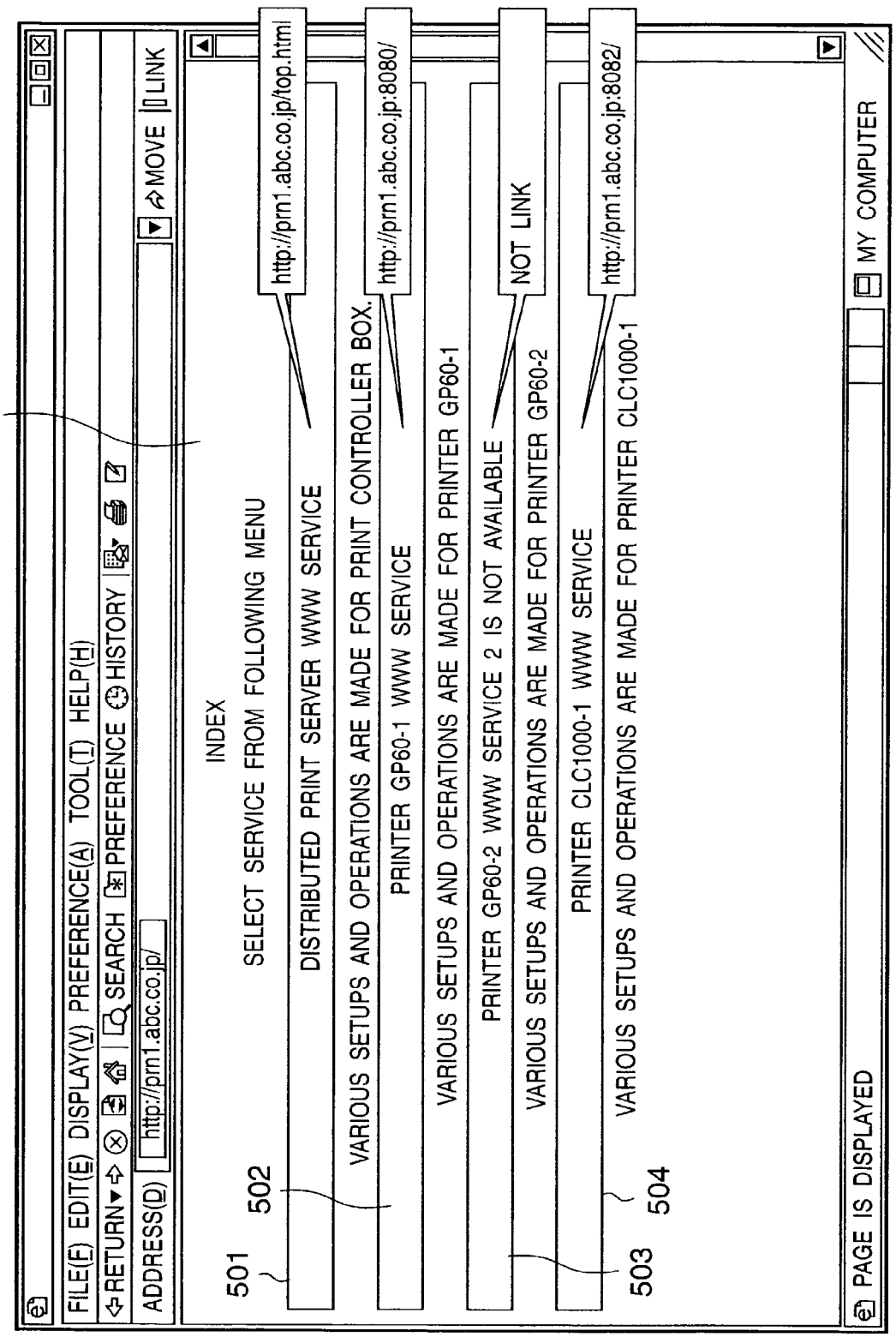
FIG. 8 is an example of browser image displaying a menu image of the distributed print controller according to the third embodiment.

Further, FIG. 8 is an example of a menu image 506 displayed on the browser of the client apparatus when the WWW service of the printer 211b is unavailable. In this example, the name of unavailable printer is invert-displayed, and a notification of suspension of service is displayed.

As the distributed print server monitors the status of transfer destination printer, in a case where the transfer destination printer does not provide the WWW service when e.g. the power is shut down, disables the transfer to the printer as shown in FIG. 8.

In this manner, even in a case where plural image processing apparatuses are connected to the external controller, the WWW services provided by the external controller and all the image processing apparatuses can be used from the client apparatus.

Fourth Embodiment

A distributed print server 300 according to the first and third embodiments and a print controller box 320 according to the second embodiment will be described in detail.

Figure 9:
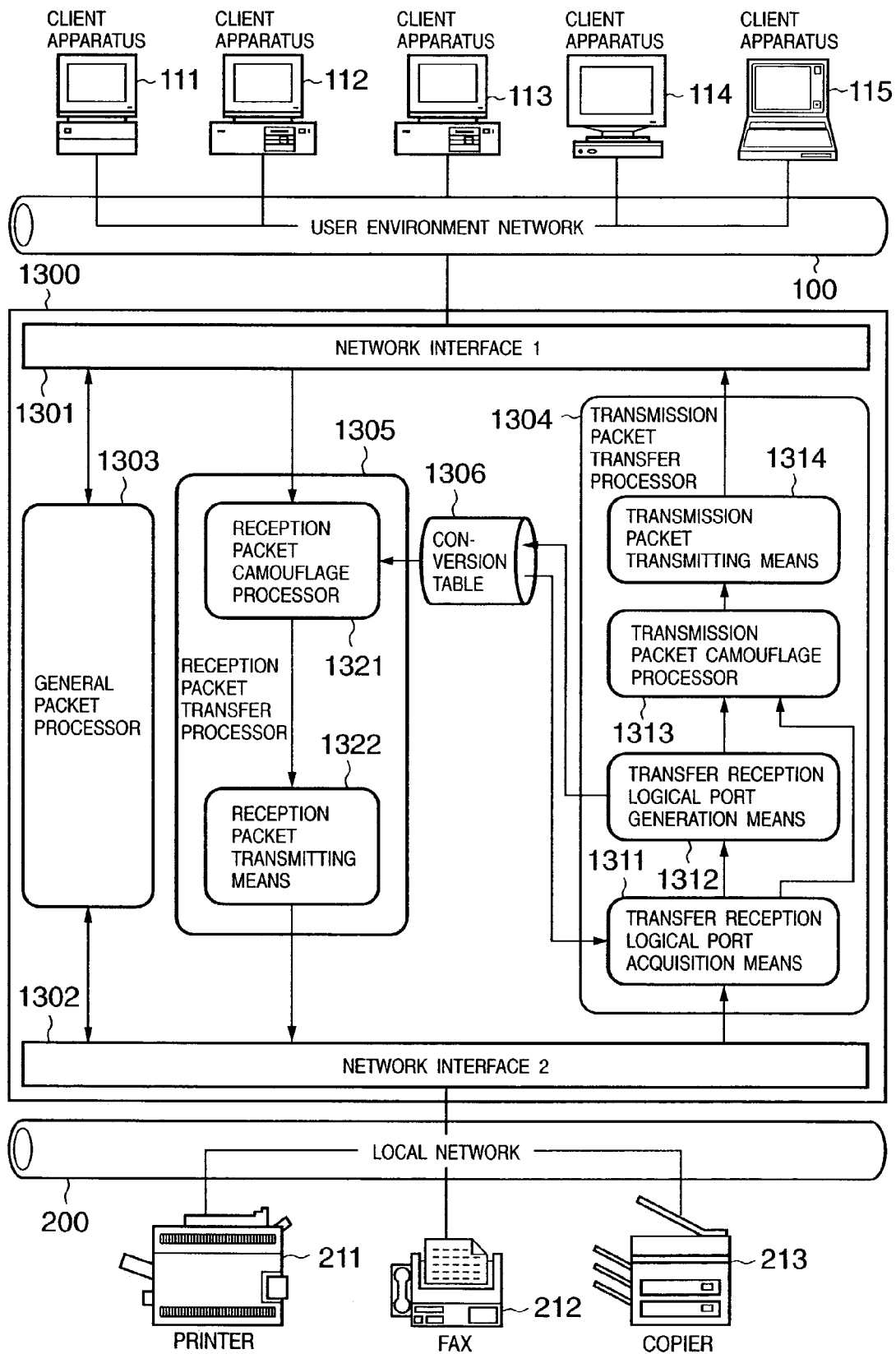
FIG. 9 is a diagram showing the overview of the system including the print controller box (external controller apparatus)

FIG. 9 is an explanatory view showing the overview of the system including the print controller box according to a fourth embodiment of the present invention. This controller box 1300 corresponds to the distributed print server 300 shown in FIGS. 1 and 5, or the controller box 320 shown in FIGS. 2 and 3.

This controller box 1300 has a basic function of receiving print data (PDL data) in printer description language (PDL) from the client apparatuses (PCs, Macintosh machines, UNIX work stations or the like) 111 to 115, performing processing such as PDL interpretation, image bitmapping and image combining on the PDL data to generate image data, then transmits the image data to the image processing apparatuses 211 to 213 for printing.

Further, the print controller box 1300 has two network communication interfaces (network interface 1 (1301) and network interface 2 (1302)) connected to the user environment network 100 and the local network 200.

The image processing apparatuses 211 to 213 respectively having a printer function are connected to the local network 200. The image processing apparatuses are a printer (211), a facsimile machine (212) and a copier (213) here, however, combined devices and the like may be used.

In the client apparatuses 111 to 115 connected to the user environment network 100, a printer driver converts data outputted from an application program to print data in printer description language and transfers the print data to the controller box.

Further, the print controller box 1300 has a hardware construction including a computation processing unit, a recording device, a memory and the like.

Further, the print controller box 1300 has the following functional construction. The network interface 1301 (NIC1) and the network interface 1302 (NIC2) are interfaces for connection with the user environment network 100 and the local network 200.

Further, a general packet processor 1303 performs packet input/output processing for the respective network interfaces. A transmission packet transfer processor 1304 performs packet transfer from the image processing apparatuses 211 to 213 to the client apparatuses 111 to 115.

A reception packet transfer processor 1305 performs packet transfer from the client apparatuses 111 to 115 to the image processing apparatuses 211 to 213. A conversion table 1306 holds records of ways of packet transfer.

Further, the transmission packet transfer processor 1304, having transfer reception logical port acquisition means 1311, transfer reception logical port generation means 1312, a transmission packet camouflage processor 1313 and a transmission packet transmitting processor 1314, performs camouflage processing on a packet transferred from the local network 200 to the user environment network 100.

Further, the reception packet transfer processor 1305, having a reception packet camouflage processor 1321 and reception packet transmitting means 1322, performs camouflage processing on a packet transferred from the network 100 to the local network 200.

Next, the networks will be described. The user environment network 100 and the local network 200 are independent networks having different logical network addresses.

In this embodiment, network communication is performed by using the Internet Protocol (IP). The user environment network has a network address "192.168.1.0" and a subnet mask "255.255.255.0"; and the local network has a network address "10.255.255.0" and a subnet mask "255.255.255.0".

Next, the image processing apparatuses will be described. The image processing apparatuses 211 to 213, having a network communication function, can utilize or provide various services via the user environment network 100 when the apparatuses are directly connected to the network 100 without the controller box. For example, the image processing apparatuses 211 to 213 provide a so-called push-scan function of scanning a document (original) and transferring read data to the client apparatus 110, a so-called pull-print function of downloading image data published on a network web server (WWW server) and print-outputting the image data, and the like.

For example, assuming that the image processing apparatus has only one Ethernet physical port, if the apparatus is connected to the print controller box via the Ethernet physical port, there is no means for communication with the other network devices.

In the system, even when the apparatus is connected to the print controller box, access to the user environment network via the controller box is realized. Hereinbelow, the details of the packet camouflage processing and transfer processing performed inside the print controller box 1300 will be described.

First, the case of pull-print of data file on the WWW server by the image processing apparatuses 211 to 213 will be described. The address values of the respective network devices are as follows. The WWW server has an address "209.137.157.33"; a user environment router has an address "192.168.1.10"; the network interface 1 of the controller box has an address "192.168.1.112"; the network interface 2 of the controller box has an address "10.255.255.1"; and the image processing apparatus has an address "10.255.255.2".

When the user designates an URL of file to be downloaded by using an operation panel of the image processing apparatus (211 to 213), the image processing apparatus instructs the network address corresponding to the URL to download the file by the HTTP protocol. The HTTP utilizes the TCP as a lower order protocol, and the TCP utilizes the IP as a lower order protocol. As the network address of the WWW server cannot be directly reached from the image processing apparatus (211 to 213), the image processing apparatus sends an IP packet to the print controller box 1300 registered as a Gateway.

Assuming that the number of logical port opened by the image processing apparatus (211 to 213) for this TCP session is "1234", the packet sent to the network interface 2 of the print controller box 1300 has a transmission source address (a network address of an apparatus that transferred data) "10.255.255.2", a transmission source logical port number "1234", a transmission destination address "209.137.157.33", and a transmission destination logical port number "80".

Figure 10:
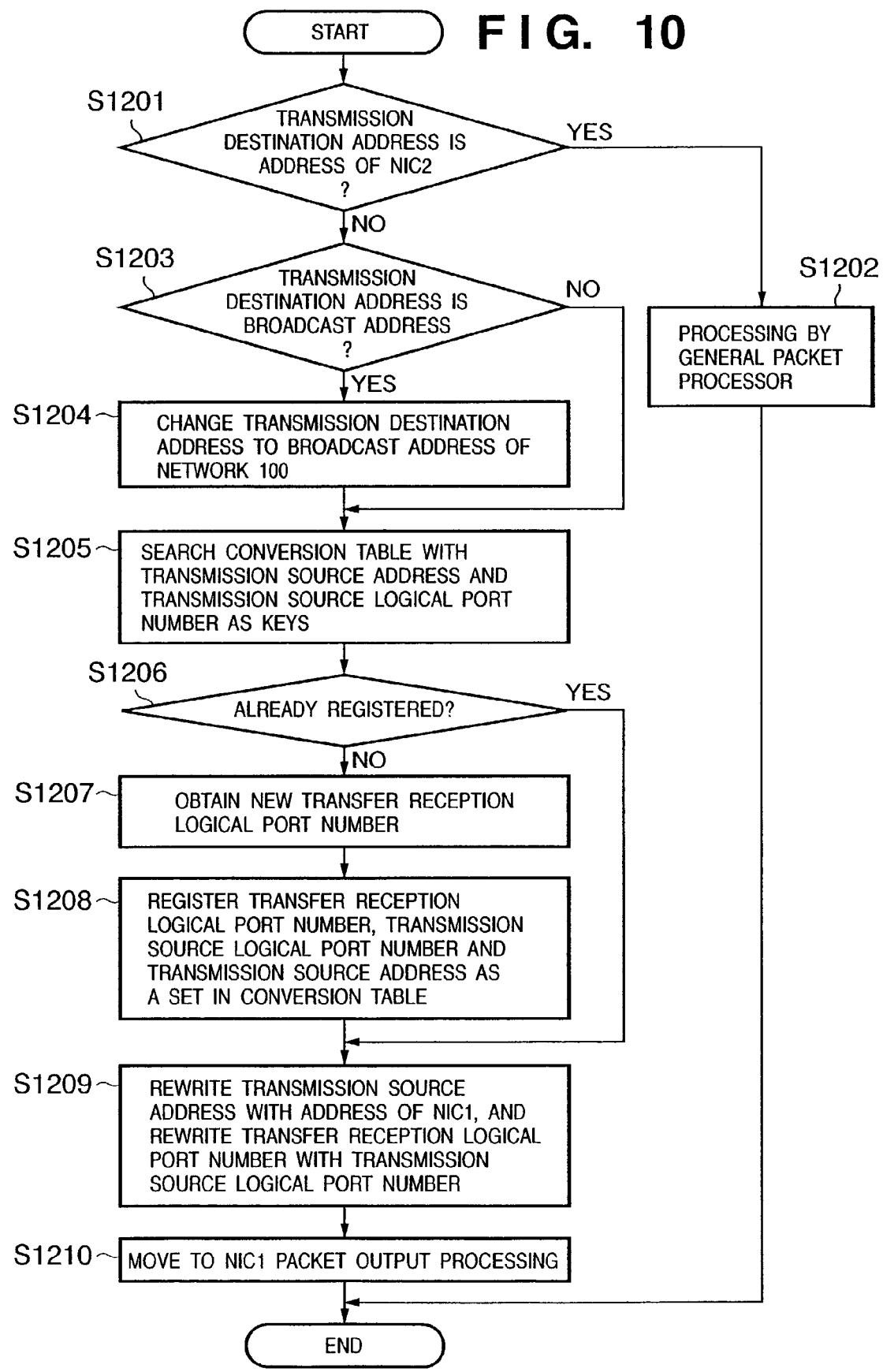
FIG. 10 is a flowchart showing processing on a packet inputted into a network interface 2.

The print controller box 1300 processes the packet inputted into the network interface 2 as shown in the flowchart of FIG. 10.

First, it is determined whether or not the transmission source address of the packet is the address of the network interface 2 (step S1201). If the packet is directed to the network interface 2, the general packet processor performs general processing on the packet (step S1202).

Next, it is determined whether or not the transmission destination address is a broadcast address (step S1203). If it is a broadcast address, the transmission destination address of the packet is changed to a broadcast address in the network 100 (step S1204). In this example, the address is changed to "192.168.1.255".

Next, it is determined whether or not the set of the transmission source addresses and the transmission source logical port number of the packet is registered in the conversion table (step S1205).

FIG. 12 shows an example of the conversion table. In the conversion table, transmission reception logical port numbers are registered in correspondence with transmission source addresses and transmission source logical port numbers. Accordingly, the set of the transmission source address and the transmission source logical port number of the packet is compared with sets of transmission source addresses and transmission source logical port numbers in the table, and a transmission reception logical port number is obtained.

It is determined whether or not this set is registered in the conversion table, i.e., whether or not a transfer reception logical port number has been obtained (step S1206). If the set is not registered, a transfer reception logical port is newly opened (step S1207), and its number is newly registered in the conversion table (step S1208). In use of newly opened port number or in use of port number obtained from the conversion table, the same operation follows.

Next, the transmission source address of the packet is rewritten with the address of the NIC1, and the transmission source logical port number of the packet is rewritten with the transmission reception logical port number (step S1209). For example, if the transfer reception logical port number is "54321", the header of the packet is rewritten as follows. If the address or port number in the header is changed, the check sum value is also changed, however, in this example, the change of check sum value will not be particularly described. The transmission source address of the header is "192.168.1.112"; the transmission source logical port number is "54321"; the transmission destination address is "209.137.157.33"; and the transmission destination logical port number is "80".

Thereafter, as in the case of general packet transmission from the NIC1, this packet is transmitted to the user environment network or router (step S1210). In this case, as the transmission destination is connected to a further network, the packet is transferred to the user environment router.

In this manner, by packet camouflage processing, the WWW server that receives the packet determines that the destination of the packet is not the image processing apparatus (211 to 213) but the print controller box 1300, and sends a response packet, normally, to the print controller box 1300. The response packet has a transmission source address "209.137.157.33", a transmission source logical port number "80", a transmission destination address "192.168.1.112", and a transmission destination logical port number "54321".

Figure 11:
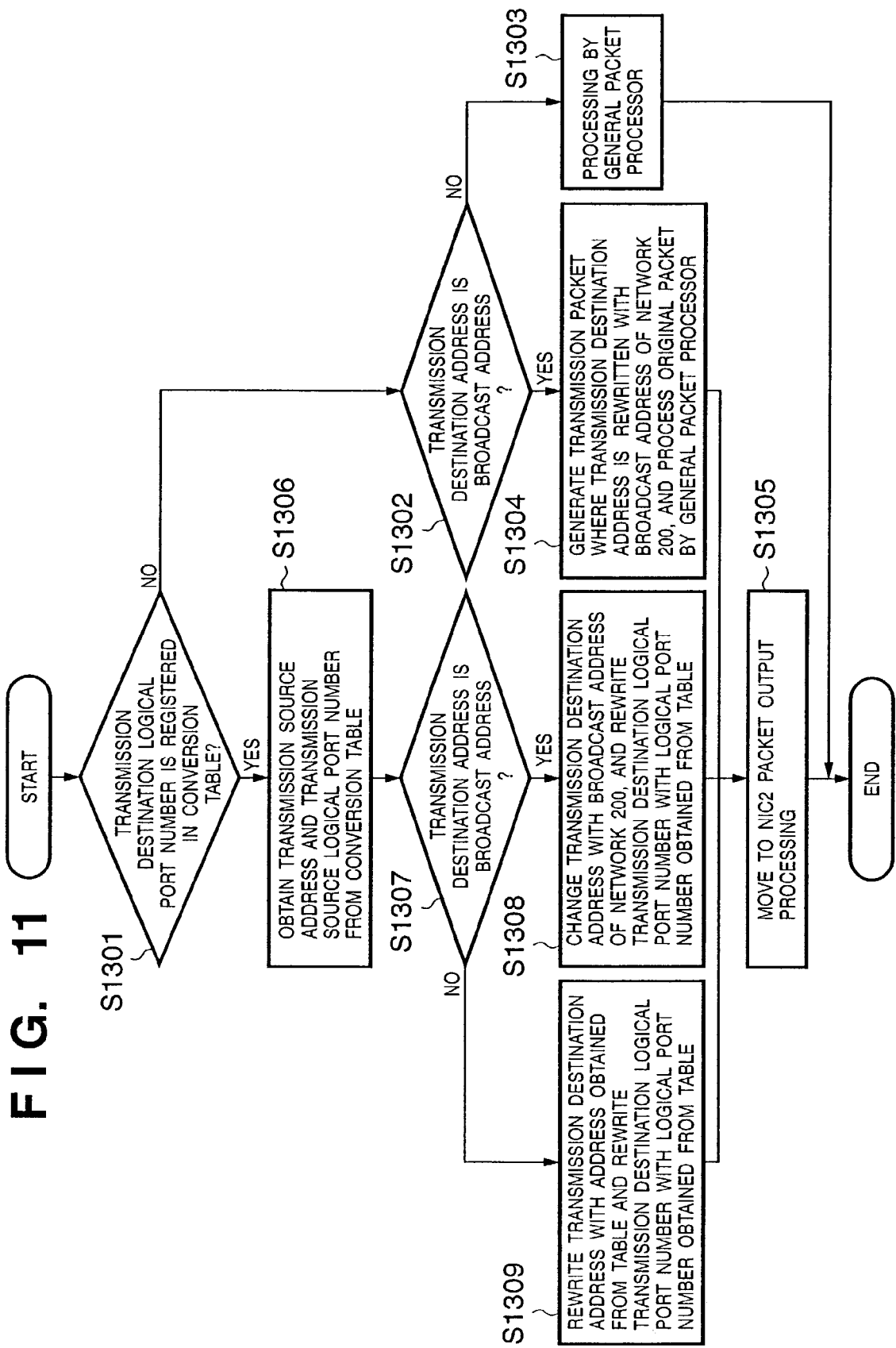
FIG. 11 is a flowchart showing processing on a packet inputted into a network interface 1.

When the above packet is inputted into the NIC1 of the print controller box 1300, the packet is processed as shown in the flowchart of FIG. 11.

First, it is checked whether or not the transmission destination logical port number of the received packet is registered as the transfer reception port number in the conversion table (step S1301). The checking is made by comparing the transmission destination logical port number with the transfer reception logical port numbers recorded in the conversion table.

If the transmission destination logical port number is not registered, it is determined whether or not the transmission destination address is a broadcast address (step S1302). If the address is not a broadcast address, it is determined that the packet is directed to the controller box, and general packet processing is performed (step S1303).

If the transmission destination address of the packet is a broadcast address, the packet is duplicated. The transmission destination address of the duplicate packet is changed to a broadcast address in the network 200, and the duplicate packet is broadcasted on the network 200 (step S1305). The original packet is subjected to the general packet processing (step S1304).

If the transmission destination logical port number of the packet is registered as the transfer reception port number in the conversion table, the corresponding transmission source address and transmission source port number are obtained (step S1306).

Then it is determined whether or not the transmission destination address of the packet is a broadcast address (step S1307). If the transmission destination address of the packet is a broadcast address, the transmission destination address of the packet is changed to a broadcast address in the network 200 for broadcasting on the network, and the transmission destination logical port number of the packet is changed to the transmission source logical port number obtained at step S1306 (step S1308).

Further, if the transmission destination address of the packet is not a broadcast address, the transmission destination address of the packet is changed to the transmission source address obtained at step S1306 for transmission of packet to the predetermined image processing apparatus, and the transmission destination logical port number of the packet is changed to the transmission source logical port number obtained at step S1306 (step S1309).

In FIG. 12, as the transmission destination logical port number is registered in the conversion table, the header of the packet is rewritten as follows by the obtained address and port number. That is, the transmission source address of the packet is "209.137.157.33", the transmission source logical port number is "80", the transmission destination address is "10.255.255.2", and the transmission destination logical port number is "1234".

Note that the packet is transmitted from the NIC2 to the network 200 as in the case of general packet. The image processing apparatus (211 to 213) determines that the packet is transmitted from the WWW server, and performs the subsequent processing.

In the above description, the image processing apparatus (211 to 213) transmits a packet instructing file download to the control box for pull-print of data file on the WWW server. When the image processing apparatus (211 to 213) provides a push-scan function, the apparatus transmits a packet including read data to the control box, and the control box performs similar processing. In this case, the transmission destination address of the packet is set to the address of client apparatus as the transmission destination.

It is significant in this series of processing that the address of the local network 200 is not included at all in the packet of the user environment network 100. Accordingly, even in a case where plural controller boxes are connected to the user environment network 100 and the controller boxes are connected to different local networks, the plural local networks can use the same local network address.

Further, the image processing apparatus performs the same transmission processing as that in the case where the apparatus is directly connected to the user environment network 100. Further, the series of processing is applicable to other protocols than the TCP/IP as long as the route and destination are specified by the logical address and logical port number described in a packet header. For example, similar advantages can be obtained in use of UDP/IP, IPX and the like.

Further, as a response packet to a packet transmitted from a particular image processing apparatus among plural image processing apparatuses is transmitted to the particular image processing apparatus, communication is appropriately performed.

Note that in some protocols, a different operation from that in direct connection with the user environment network 100 is performed, and normal communication cannot be performed. One of the causes is that the image processing apparatus and the client apparatus on the network 100 belong to different sub networks and therefore a broadcast packet cannot be transmitted. A broadcast packet is used for e.g. searching for a corresponding device on the network. For example, ICMP support device search by an ECHO command of the ICMP, the SMB name solution service and the RPC service search are well known.

In the present invention, the problem of broadcast packet is solved. Next, an example of search by broadcast packet will be described. In this example, an image processing apparatus, which is to perform remote parallel copying, searches for another image processing apparatus to support the remote parallel copying by using a broadcast packet. The address values and port numbers of the respective network devices are as follows. Note that remote parallel copying means transmitting print data to at least one image processing apparatus found by a search and performing printing by plural image processing apparatuses in parallel.

The image processing apparatus (external image device) directly connected to the user environment network 100 has a logical address "192.168.1.111"; the NIC1 of the controller box has an address "192.168.1.112"; the NIC2 of the controller box has an address "10.255.255.1"; and the image processing apparatus (internal image device) connected to the local network 200 has a logical address "10.255.255.2". Further, the port number of the remote parallel copying service is "47545".

The internal image device first broadcast-transmits an UDP packet to check whether or not a device supporting the remote parallel copying exists in the same subnet. Assuming that the logical port number used in the transmission is "2234", the transmission source address in the header of the packet is "10.255.255.2", the transmission source logical port number is "2234", the transmission destination address is "10.255.255.255", and the transmission destination logical port number is "47545".

The print controller box 1300 processes the broadcast packet inputted into the NIC2 as shown in the flowchart of FIG. 10. First, it is checked that the transmission destination address is not the address of the NIC2 (NO at step S1201). Next, it is checked whether or not the transmission destination address is a broadcast address (step S1203). If the address is a broadcast address, the transmission destination address is changed to a broadcast address in the network 100 (step S1204).

Thereafter, the transmission source address of the packet is changed to the address of the NCI1, and the logical port number of the packet is changed to a reception transfer port number ("5532" in this example), as packet camouflage. The packet transmitted to the network 100 has a transmission source address "192.168.1.112", a transmission source logical port number "55321", a transmission destination address "192.168.1.255" and a transmission destination logical port number "47545".

Next, in a case where a response packet from the external image device has a transmission source address "209.137.157.33", a transmission source logical port number "47545", a transmission destination address "192.168.1.111" and a transmission destination logical port number "55321", packet conversion is performed. The packet transmitted to the internal image device has a transmission source address "209.137.157.33", a transmission source logical port number "47545", a transmission destination address "10.255.255.2" and a transmission destination logical port number "2234".

Then the internal image device receives the packet as a response to the broadcast packet, thereby recognizes the external image device provided with the remote parallel copying service, having the transmission source address "209.137.157.33".

Other Embodiment

Note that in FIG. 5, the system has only one network interface connected to the printer side, connected via a local network to plural printers, however, the present invention is not limited to this arrangement. Plural network interfaces may be provided for image processing apparatuses. Further, in FIGS. 1, 2 and 5, the respective networks are cable-connected, however, the present invention is not limited to this arrangement. External controller apparatus may use a network interface which constructs a radio network by using radio LAN technique, the Blue Tooth technique or the like.

Further, the present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for realizing the aforesaid functions according to the embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiments.

Thus, the present invention provides a control apparatus, which exists between a client apparatus and an image processing apparatus, and which controls access from the client apparatus such that the client apparatus can use an information providing function in the image processing apparatus, and a control method, a control program and a storage medium holding the program.

As described above, according to the above-described embodiments, even if an external control apparatus is connected between an image processing apparatus which can perform network communication and a network, a data transmission function of the image processing apparatus can be provided to the client apparatus.

Further, since the number of network addresses consumed for the external controller apparatus and the image processing apparatus in a user environment network is one, the resources in the LAN can be saved.

Further, a broadcasted packet can be transmitted from the image processing apparatus via the external controller apparatus to the network device.

Further, the image processing apparatus does not change the way of network communication processing regardless of the existence or absence of external controller. Accordingly, it is not necessary to develop the communication function of the image processing apparatus such as data transfer depending on external controller. Thus the development costs of the image processing apparatus and period of development can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus which controls data communication between a client apparatus and an image processing apparatus, said control apparatus comprising:
a first transfer unit adapted to transfer first display information to be displayed by a browser of said client apparatus to said client apparatus through a first network interface of said control apparatus in response to an access based on designation of a first address of said control apparatus from said client apparatus, wherein the first display information includes a link to a second address different from the first address; and
a second transfer unit adapted to receive, in response to an access based on designation of the second address from said client apparatus, second display information to be displayed by the browser from said image processing apparatus through a second network interface of said control apparatus different from the first network interface, and to transfer the received second display information to said client apparatus through the first network interface, wherein the access based on the designation of the second address is performed based on the link to the second address included in the first display information transferred by said first transfer unit,
wherein said control apparatus, said client apparatus, and said image processing apparatus are separate apparatuses.

2. The control apparatus according to claim 1, further comprising a setting unit for selectively setting enabled/disabled status of said second transfer unit,
wherein if said second transfer unit is enabled, said first transfer unit transfers, to said client apparatus, the first display information including the link to the second address, and if said second transfer unit is not enabled, said first transfer unit transfers, to said client apparatus, display information, not including the link to the second address, to be displayed by the browser.

3. The control apparatus according to claim 1, wherein each of the first address and the second address comprises (a) an IP address of said control apparatus and (b) a port number, or comprises (a) a DNS name of said control apparatus and (b) a port number.

4. The control apparatus according to claim 1, wherein said control apparatus communicates with each of said image processing apparatus and another image processing apparatus via a network,
wherein said first transfer unit transfers the first display information including the link to the second address corresponding to said image processing apparatus and a link to a third address corresponding to said another image processing apparatus, and
wherein said second transfer unit receives, in response to an access based on the designation of the third address from said client apparatus, third display information to be displayed by the browser from said another image processing apparatus and transfers the received third display information to said client apparatus, wherein the access based on the designation of the third address is performed based on the link to the third address included in the first display information transferred by said first transfer unit.

5. The control apparatus according to claim 4, wherein, if one of said image processing apparatus and said another image processing apparatus cannot transfer the second display information or the third display information, said first transfer unit transfers the fourth display information including a notification of suspension of service at the one of said image processing apparatus and said another image processing apparatus.

6. A control apparatus which controls data communication between a client apparatus and an image processing apparatus, said control apparatus comprising:
a memory holding a program for (a) transferring first display information to be displayed by a browser of said client apparatus to said client apparatus through a first network interface of said control apparatus in response to an access based on designation of a first address of said control apparatus from said client apparatus, wherein the first display information includes a link to a second address different from the first address, (b) receiving, in response to an access designating the second address from said client apparatus, second display information to be displayed by the browser from said image processing apparatus through a second network interface of said control apparatus different from the first network interface, wherein the access based on the designation of the second address is performed based on the link to the second address, and (c) transferring the received second display information to said client apparatus through the first network interface; and
a processor that performs said program for (a) transferring the first display information including the link to the second address to said client apparatus in response to the access based on the designation of the first address from said client apparatus, (b) receiving, in response to the access based on the designation of the second address from said client apparatus, the second display information from said image processing apparatus, and (c) transferring the received second display information to said client apparatus,
wherein said control apparatus, said client apparatus, and said image processing apparatus are separate apparatuses.

7. A control method for a control apparatus which controls data communication between a client apparatus and an image processing apparatus, said control method comprising:
transferring first display information to be displayed by a browser of said client apparatus to said client apparatus through a first network interface of said control apparatus in response to an access of said control apparatus designating a first address from said client apparatus, wherein the first display information includes a link to a second address different from the first address;

receiving, in response to an access based on designation of the second address from said client apparatus, second display information to be displayed by the browser from said image processing apparatus through a second network interface of said control apparatus different from the first network interface, wherein the access designating the second address is performed based on the link to the second address; and transferring the received second display information to said client apparatus through the first network interface, wherein said control apparatus, said client apparatus, and said image processing apparatus are separate apparatuses.

8. A control program stored in a computer-readable storage medium for controlling data communication between a client apparatus and an image processing apparatus, for realizing by execution by a control apparatus, said control program comprising:

a transfer step of transferring first display information to be displayed by a browser of said client apparatus to said client apparatus through a first network interface of said control apparatus in response to an access based on designation of a first address of said control apparatus from said client apparatus, wherein the first display information includes a link to a second address different from the first address;

a transfer step of, in response to an access designating the second address from said client apparatus, receiving, in response to an access based on designation of the second address from said client apparatus, second display information to be displayed by the browser from said image processing apparatus through a second network interface of said control apparatus different from the first network interface and transferring the received second displayed information to said client apparatus through the first network interface, wherein the access based on the designation of the second address is performed based on the link to the second address, wherein said control apparatus, said client apparatus, and said image processing apparatus are separate apparatuses.

9. A control apparatus which controls data communication between a client apparatus and an image processing apparatus, said control apparatus comprising:

a first transfer unit adapted to transfer first display information to be displayed by a browser of said client apparatus to said client apparatus through a first network interface of said control apparatus in response to an access to a first communication port of said control apparatus from said client apparatus, wherein the first display information includes a link to a second communication port different from the first communication port; and a second transfer unit adapted to receive, in response to an access to the second communication port from said client apparatus, second display information to be displayed by the browser from said image processing apparatus through a second network interface of said control apparatus different from the first network interface, and transfer the received second display information to said client apparatus through the first network interface, wherein the access to the second communication port is performed based on the link to the second communication port included in the first display information transferred by said first transfer unit, wherein said control apparatus, said client apparatus, and said image processing apparatus are separate apparatuses.

10. The control apparatus according to claim 9, wherein the first communication port is a communication port corresponding to a default port number in the browser.

11. The control apparatus according to claim 9, wherein the link comprises (a) an IP address of said control apparatus and (b) a port number of the second communication port, or comprises (a) a DNS name of said control apparatus and (b) a port number of the second communication port.

12. The control apparatus according to claim 9, further comprising a setting unit for selectively setting enabled/disabled status of said second transfer unit, wherein, if said second transfer unit is enabled, said first transfer unit transfers, to said client apparatus, the first display information including the link to the second communication port, and if said second transfer unit is not enabled, said first transfer unit transfers, to said client apparatus, display information, not including the link to the second communication port, to be displayed by the browser.

13. The control apparatus according to claim 9, wherein said control apparatus communicates with each of said image processing apparatus and another image processing apparatus via a network, wherein said first transfer unit transfers the first display information including the link to the second communication port corresponding to said image processing apparatus and a link to a third communication port corresponding to said another image processing apparatus, and wherein said second transfer unit receives, in response to an access to the third communication port from said client apparatus, third display information to be displayed by the browser from said another image processing apparatus and transfers the received third display information to said client apparatus, wherein the access to the third communication port is performed based on the link to the third communication port included in the first display information transferred by said first transfer unit.

14. The control apparatus according to claim 13, wherein, if one of said image processing apparatus and said another image processing apparatus cannot transfer the second display information or the third display information, said first transfer unit transfers fourth display information including a notification of suspension of service at the one of said image processing apparatus and said another image processing apparatus.

15. A control method for a control apparatus which controls data communication between a client apparatus and an image processing apparatus, said control method comprising the steps of:

transferring first display information to be displayed by a browser of said client apparatus to said client apparatus through a first network interface of said control apparatus in response to an access to a first communication port of said control apparatus from said client apparatus, wherein the first display information includes a link to a second communication port different from the first communication port;

receiving, in response to an access to the second communication port from said client apparatus, second display information to be displayed by the browser from said image processing apparatus through a second network interface of said control apparatus different from the first network interface, wherein the access to the second communication port is performed based on the link to the second communication port included in the first display information; and transferring the received second display information to said client apparatus through the first network interface, wherein said control apparatus, said client apparatus, and said image processing apparatus are separate apparatuses.

16. A control apparatus which controls data communication between a client apparatus and an image processing apparatus, said control apparatus comprising:

first transfer means for transferring first display information to be displayed by a browser of said client apparatus to said client apparatus through a first network interface of said control apparatus in response to an access based on designation of a first address of said control apparatus from said client apparatus, wherein the display information includes a link to a second address different from the first address; and second transfer means for receiving, in response to an access based on designation of the second address from said client apparatus, second display information to be displayed by the browser from said image processing apparatus through a second network interface of said control apparatus different from the first network interface, and to transfer the received second display information to said client apparatus through the first network interface, wherein the access based on the designation of the second address is performed based on the link to the second address included in the first display information transferred by said first transfer means, wherein said control apparatus, said client apparatus, and said image processing apparatus are separate apparatuses.

17. A control apparatus which controls data communication between a client apparatus and an image processing apparatus, said control apparatus comprising:

first transfer means for transferring first display information to be displayed by a browser of said client apparatus to said client apparatus through a first network interface of said control apparatus in response to an access to a first communication port of said control apparatus from said client apparatus, wherein the first display information includes a link to a second communication port different from the first communication port; and second transfer means for receiving, in response to an access to the second communication port from said client apparatus, second display information to be displayed by the browser from said image processing apparatus through a second network interface of said control apparatus different from the first network interface, and transfer the received second display information to said client apparatus through the first network interface, wherein the access to the second communication port is performed based on the link to the second communication port included in the first display information transferred by said first transfer means, wherein said control apparatus, said client apparatus, and said image processing apparatus are separate apparatuses.

* * * * *

UNITED STATES PATENT AND TRADEMARK OFFICE
CERTIFICATE OF CORRECTION

PATENT NO. : 7,408,661 B2
APPLICATION NO. : 10/267645
DATED : August 5, 2008
INVENTOR(S) : Hitoshi Hoshino et al.

It is certified that error appears in the above-identified patent and that said Letters Patent is hereby corrected as shown below:

COLUMN 4
Line 56, "of system" should read --of a system--.

COLUMN 5
Line 8, "for" should read --for the--.
Line 43, "is" should be deleted.

COLUMN 6
Line 8, "include e.g." should read --include, e.g.,--.

COLUMN 12
Line 23, "of packet" should read --of the packet--.
Line 37, "of general" should read --of a general--.
Line 64, "in use" should read --in the use--.

COLUMN 13
Line 10, "for e.g." should read --for, e.g.,--.

COLUMN 16
Line 20, "the fourth" should read --fourth--.

COLUMN 20
Line 26, "means," should read --means, and--.

Signed and Sealed this

Third Day of February, 2009

JOHN DOLL
*Acting Director of the United States Patent and Trademark Office*